United States Patent [19]

Yamamoto et al.

[11] Patent Number: 5,756,193
[45] Date of Patent: May 26, 1998

[54] POLYETHYLENE RESIN COMPOSITION FOR HEAVY-DUTY PACKAGING BAG AND POLYETHYLENE RESIN FILM PRODUCED FROM THE SAME

[75] Inventors: Akihiko Yamamoto; Naoshi Hamada; Toshihiro Nishimura; Kouji Kitahara, all of Ichihara, Japan

[73] Assignee: Mitsui Petrochemical Industries, Ltd., Tokyo, Japan

[21] Appl. No.: 623,147

[22] Filed: Mar. 28, 1996

[30] Foreign Application Priority Data

Mar. 29, 1995 [JP] Japan ................. 7-072072

[51] Int. Cl.⁶ .................................. C08L 23/08
[52] U.S. Cl. ............................ 428/220; 525/240
[58] Field of Search .................... 525/240; 428/220

[56] References Cited

U.S. PATENT DOCUMENTS

| 5,089,322 | 2/1992 | Matsunaga et al. ............ 428/220 |
| 5,321,106 | 6/1994 | LaPointe ....................... 526/126 |

FOREIGN PATENT DOCUMENTS

| B14623 | 12/1983 | Australia . |
| A77957 | 11/1991 | Australia . |
| B32914 | 8/1993 | Australia . |
| 0359440 | 3/1990 | European Pat. Off. . |
| 0587365 | 3/1994 | European Pat. Off. . |
| 0593221 | 4/1994 | European Pat. Off. . |
| 0729831 | 9/1996 | European Pat. Off. . |
| 6-9724 | 1/1994 | Japan . |
| 6136196 | 5/1994 | Japan . |
| 6207057 | 7/1994 | Japan . |
| WO 89/04346 | 5/1989 | WIPO . |
| WO 94/06859 | 3/1994 | WIPO . |
| WO 94/25523 | 11/1994 | WIPO . |

OTHER PUBLICATIONS

Van der Sanden et al., "A New Family of Linear Ethylene Polymers Provides Enhanced Sealing Performance" Tappi Journal, pp. 99–103, Feb. 1992.

Schut, "Enter a New Generation of Polyolefins" Plastics Technology, pp. 15–17, Nov. 1991.

Derwent World Patents Index, Abstract of Japanese Laid-Open Patent Publication No. 08-208895 (Aug. 13, 1996).

*Primary Examiner*—Paul J. Thibodeau
*Assistant Examiner*—D. Lawrence Tarazaho
*Attorney, Agent, or Firm*—Sherman and Shalloway

[57] ABSTRACT

Disclosed is a polyethylene resin composition for heavy-duty packaging bag, which has a specific MFR, a specific density and a specific melt tension and which comprises (I) a linear low-density polyethylene resin prepared from ethylene and an α-olefin of 4 or more carbon atoms and having a specific MFR, a specific molecular weight distribution and a density of 0.900 to 0.918 g/cm$^3$, (II) a linear medium or high-density polyethylene resin having a density of 0.935 to 0.970 g/cm$^3$ and (III) a high-pressure low-density polyethylene resin having a density of 0.915 to 0.924 g/cm$^3$, in a specific ratio of components. Also disclosed is a polyethylene resin film prepared from said composition. The composition is able to provide a film which is excellent in low-temperature properties such as low-temperature drop-bag strength and can be advantageously used for a heavy-duty packaging bag even in a cold district of below-freezing temperature. The polyethylene resin film exerts the above-mentioned effects.

6 Claims, No Drawings

5,756,193

POLYETHYLENE RESIN COMPOSITION FOR HEAVY-DUTY PACKAGING BAG AND POLYETHYLENE RESIN FILM PRODUCED FROM THE SAME

FIELD OF THE INVENTION

The present invention relates to a polyethylene resin composition for heavy-duty packaging bag suitable for packaging organic fertilizers, etc., and to a polyethylene resin film for heavy-duty packaging bag produced from the composition.

BACKGROUND OF THE INVENTION

Conventionally, industrial heavy-duty packaging bags made of polyolefin resin films have been widely used as heavy-duty packaging bags of organic fertilizers or the like because they show excellent moisture resistance and can readily be sealed by heating. The polyolefin resin films used for such heavy-duty packaging bags are produced by molding high-pressure low-density polyethylene resins or molding other high-pressure low-density polyethylene resins prepared by copolymerizing with about 3 to 6% by mol of vinyl acetate into a thickness of about 200 μm.

In recent years, various packaging materials tend to be thinned for the purpose of resource conservation. However, the high-pressure low-density polyethylene resin films are inferior in strength, rigidity and gloss to linear medium-pressure or low-pressure low-density polyethylene resin films, so that use of the linear low-density polyethylene resins having higher strength and rigidity than the high-pressure low-density polyethylene resins have been increased.

However, the linear low-density polyethylene resins are poor in moldability. Especially, when the linear low-density polyethylene resins are subjected to inflation molding, the motor load of the extruder becomes high due to their melt properties, so that the bubble stability is worse than in the case of the high-pressure low-density polyethylene resins. Further, when thick films are formed, cooling of bubbles sometimes becomes insufficient to make the bubbles unstable, so that films are hard to form and the film surface is likely to roughen. Therefore, it is difficult to produce films from the linear low-density polyethylene resins by the use of molding machines designed for high-pressure low-density polyethylene, which have narrow lip width and small motor capacity. For solving these problems, apparatus equipped with a die of large lip width, a screw of small compression ratio and a motor of large capacity and enhanced in the cooling power are generally used as machines for producing films from the linear low-density polyethylene resins.

Accordingly, the present inventors have proposed, in Japanese Patent Laid-Open Publication No. 67347/1990, a polyethylene resin composition capable of producing a thin film having a good balance of strength, rigidity and gloss and excellent in low-temperature resistance and heat sealability through contaminants by the use of a machine of narrow lip width and small motor capacity, and also proposed a film therefrom.

This polyethylene resin composition comprises:

(A) a specific linear low-density polyethylene, which is an ethylene-α-olefin copolymer prepared from ethylene and an α-olefin of 4 or more carbon atoms and has a density of 0.900 to 0.918 g/cc, in an amount of 30 to 50% by weight, (B) a specific high-density polyethylene resin having a density of 0.935 to 0.950 g/cc, in an amount of 20 to 40% by weight, and (C) a specific high-pressure low-density polyethylene resin having a density of 0.915 to 0.924 g/cc, in an amount of 10 to 40 % by weight.

This composition has a melt flow rate (190° C.) of 0.2 to 1.0 g/10 min, a density of 0.918 to 0.935 g/cc and a melt tension of not less than 5 g.

The film proposed in this publication is a film of 50 to 250 μm in thickness obtained by subjecting the above-mentioned polyethylene resin composition to air-cooling inflation. This film has a gloss of not less than 50%, a Young's modulus in tension of not less than 3,500 kg/cm$^2$ and a dart impact strength of not less than 40 kg/cm.

The film of the above polyethylene resin composition has moderately good low-temperature properties, but it is not necessarily sufficient in the low-temperature properties, such as low-temperature drop-bag strength, required for polyethylene resin films for heavy-duty packaging bag used in a cold district of below-freezing temperature.

Therefore, there is a strong demand to provide a polyethylene resin composition capable of producing a film which has such high low-temperature properties particularly low-temperature drop-bag strength that it can advantageously be used for a heavy-duty packaging bag even in a cold district of below-freezing temperature and a polyethylene resin film produced from the composition.

OBJECT OF THE INVENTION

The present invention has been made with a view toward solving the above problems associated with the prior art.

An object of the invention is to provide a polyethylene resin composition capable of producing a film which has such high low-temperature properties particularly low-temperature drop-bag strength that it can be advantageously used for a heavy-duty packaging bag even in a cold district of below-freezing temperature and to provide a polyethylene resin film produced from the composition.

SUMMARY OF THE INVENTION

The present invention provides a polyethylene resin composition for heavy-duty packaging bag comprising:

(I) 40 to 70 parts by weight of a linear low-density polyethylene resin prepared from ethylene and an α-olefin of 4 or more carbon atoms and having a melt flow rate (190° C.) of 0.1 to 1.0 g/10 min, a density of 0.900 to 0.918 g/cm$^3$ and a molecular weight distribution (Mw/Mn), as measured by GPC, of 1.5 to 3.5, (II) 1 to 55 parts by weight of a linear medium or high-density polyethylene resin having a density of 0.935 to 0.970 g/cm$^3$, and (III) 5 to 29 parts by weight of a high-pressure low-density polyethylene resin having a density of 0.915 to 0.924 g/cm$^3$, the total amount of said resins (I), (II) and (III) being 100 parts by weight;

said polyethylene resin composition having:

(i) a melt flow rate (190° C.) of 0.5 to 2.0 g/10 min, (ii) a density of 0.918 to 0.935 g/cm$^3$, and (iii) a melt tension of not less than 5 g.

The polyethylene resin film for heavy-duty packaging bag according to the present invention is a film prepared from a polyethylene resin composition having a melt flow rate (190° C.) of 0.5 to 2.0 g/10 min, a density of 0.918 to 0.935 g/cm$^3$, and a melt tension of not less than 5 g, by means of air-cooling inflation.

said polyethylene resin composition comprising:

(I) 40 to 70 parts by weight of a linear low-density polyethylene resin prepared from ethylene and an α-olefin of 4 or more carbon atoms and having a melt flow rate (190° C.) of 0.1 to 1.0 g/10 min, a density of 0.900 to 0.918 g/cm³ and a molecular weight distribution (Mw/Mn), as measured by GPC, of 1.5 to 3.5, (II) 1 to 55 parts by weight of a linear medium or high-density polyethylene resin having a density of 0.935 to 0.970 g/cm³, and (III) 5 to 29 parts by weight of a high-pressure low-density polyethylene resin having a density of 0.915 to 0.924 g/cm³, the total amount of said resins (I), (II) and (III) being 100 parts by weight;

said film having:
(i) a Young's modulus in tension of not less than 4,000 kg/cm², and
(ii) a dart impact strength of not less than 55 kg/cm.

DETAILED DESCRIPTION OF THE INVENTION

The polyethylene resin composition for heavy-duty packaging bag and a polyethylene resin film produced from the composition according to the invention will be described in detail hereinafter.

First, the components used in the polyethylene resin composition for heavy-duty packaging bag are described.

(I) Linear Low-Density Polyethylene Resin

The linear low-density polyethylene resin (I) used in the invention is a copolymer of ethylene and an α-olefin of 4 or more carbon atoms, preferably 4 to 20 carbon atoms.

Examples of the α-olefins include 1-butene, 1-pentene, 1-hexene, 4-methyl-1-pentene, 1-octene, 1-decene, 1-dodecene, 1-tetradecene, 1-hexadecene, 1-octadecene and 1-eicosene.

The amount of α-olefin in the copolymer is in the range of 1 to 10 % by mol, preferably 1.5 to 7% by mol.

The linear low-density polyethylene resin (I) has a melt flow rate (MFR, ASTM D 1238, 190° C., load of 2.16 kg) of 0.1 to 1.0 g/10 min, preferably 0.3 to 0.7 g/10 min. When the linear low-density polyethylene resin (I) having a melt flow rate within the above range is used, a polyethylene resin composition showing good film moldability in the air-cooling inflation can be obtained. That is, the resin composition has good extrudability in the film molding, so that a film of high bubble stability and free from surface roughening can be obtained.

The linear low-density polyethylene resin (I) has a density (ASTM D 1505) of 0.900 to 0.918 g/cm³, preferably 0.900 to 0.915 g/cm³. When the linear low-density polyethylene resin (I) having a density within the above range is used, a polyethylene resin composition capable of providing a film of high strength and rigidity can be obtained.

The linear low-density polyethylene resin (I) has a molecular weight distribution (Mw/Mn, Mw=weight-average molecular weight, Mn=number-average molecular weight), as measured by GPC, of 1.5 to 3.5, preferably 1.8 to 3.0. When the linear low-density polyethylene resin (I) having a molecular weight distribution within the above narrow range is used, a polyethylene resin composition capable of providing a film having more improved impact resistance and toughness can be obtained.

The molecular weight distribution (Mw/Mn) is measured using o-dichlorobenzen as a carrier at a column temperature of 140° C. by means of a measuring device of GPC-Waters 150° C. produced by Millipore Co.

In the present invention, the linear low-density polyethylene resin (I) is used in an amount of 40 to 70 parts by weight, preferably 40 to 65 parts by weight, more preferably 45 to 60 parts by weight, based on 100 parts by weight of the total of the resins (I), (II) and (III). When the linear low-density polyethylene resin (I) is used in the above-defined amount, a polyethylene resin composition capable of providing a film of high impact resistance and toughness can be obtained.

The linear low-density polyethylene resin (I) can be prepared by copolymerizing ethylene and an α-olefin of 4 or more carbon atoms in the presence of a metallocene catalyst for olefin polymerization containing a metallocene catalyst component, which is described in Japanese Patent Laid-Open Publications No. 9724/1994, No. 136195/1994, No. 136196/1994 and No. 207057/1994, in such a manner that the resulting copolymer has a density of 0.900 to 0.918 g/cm³.

The metallocene catalyst for olefin polymerization is formed from (a) a metallocene catalyst component comprising a Group IVB transition metal compound containing at least one ligand having cyclopentadienyl skeleton and (b) an organoaluminum oxy-compound catalyst component, and if desired, (c) a fine particle carrier, (d) an organoaluminum compound catalyst component and (e) an ionized ionic compound catalyst component.

The metallocene catalyst component (a) preferably used in the present invention is a Group IVB transition metal compound containing at least one ligand having cyclopentadienyl skeleton. The transition metal compound is, for example, a transition metal compound represented by the following formula [I].

$$ML^1_x \quad [I]$$

In the above formula, x is a valence of a transition metal atom M.

M is a transition metal atom selected from metals of Group IVB of the periodic table, specifically zirconium, titanium or hafnium, preferably zirconium.

each $L^1$ is each a ligand coordinated to the transition metal atom M, and at least one ligand $L^1$ is a ligand having cyclopentadienyl skeleton.

Examples of the ligand $L^1$ having cyclopentadienyl skeleton coordinated to the transition metal atom M include cyclopentadienyl group; alkyl-substituted cyclopentadienyl groups, such as methylcyclopentadienyl, dimethylcyclopentadienyl, trimethylcyclopentadienyl, tetramethylcyclopentadienyl, pentamethylcyclopentadienyl, methylethylcyclopentadienyl and hexylcyclopentadienyl; indenyl group; 4,5,6,7-tetrahydroindenyl group; and fluorenyl group. These groups may be substituted with halogen atoms or trialkylsilyl groups.

When the compound represented by the formula (I) contains two or more groups having cyclopentadienyl skeleton, two of them may be linked to each other through, for example, alkylene groups such as ethylene and propylene, substituted alkylene groups such as isopropylidenediphenylmethylene, silylene group, substituted silylene groups such as dimethylsilylene, diphenylsilylene and methylphenylsilylene.

Other ligands $L^1$ than the ligand having a cyclopentadienyl skeleton are a hydrocarbon group of 1 to 12 carbon atoms, an alkoxy group such as methoxy, an aryloxy group such as phenoxy, a trialkylsilyl group such as trimethylsilyl or triphenylsilyl, $SO_3R$ (provided that R is a hydrocarbon group of 1 to 8 carbon atoms which may have a substituent such as halogen), a halogen atom, or a hydrogen atom.

Examples of the hydrocarbon groups of 1 to 12 carbon atoms include alkyl groups such as methyl, cycloalkyl groups such as cyclopentyl, aryl groups such as phenyl, and aralkyl groups such as benzyl.

Examples of the ligands represented by $SO_3R$ include p-toluenesulfonato, methanesulfonato and trifluoromethanesulfonato.

The organoaluminum oxy-compound catalyst component (b) preferably used in the present invention is aluminoxane. For example, methylaluminoxane, ethylaluminoxane and methylethylaluminoxane, each having about 3 to 50 recurring units represented by the formula —Al(R)O— (provided that R is an alkyl group), are employable.

The aluminoxane can be prepared by conventionally known processes.

The fine particle carrier (c), which is optionally used in the preparation of the olefin polymerization catalyst, is an inorganic or organic compound and is granular or particulate solid having a particle diameter of usually about 10 to 300 μm, preferably 20 to 200 μm.

The inorganic carrier is preferably porous oxide, and examples thereof include $SiO_2$, $Al_2O_3$, MgO, $ZrO_2$, $TiO_2$, $B_2O_3$, CaO, ZnO, BaO, $SnO_2$ and mixtures of these oxides. These inorganic oxides may contain carbonates such as $Na_2CO_3$, sulfates such as $Al_2(SO_4)_3$, nitrates such as $KNO_3$, and oxides such as $Li_2O$, in small amounts.

Though the carriers are different from each other in their properties depending on the kinds or the preparation processes, preferably used in the present invention is a carrier having a specific surface area of 50 to 1,000 $m^2/g$, preferably 100 to 700 $m^2/g$, and a pore volume of 0.3 to 2.5 $cm^3/g$.

The carrier is used after being calcined at 100° to 1,000° C., preferably 150° to 700° C., if necessary.

The organic compound used as the fine particle carrier is, for example, a (co)polymer prepared using as its major component an α-olefin of 2 to 14 carbon atoms such as ethylene or 4-methyl-1-pentene, or a (co)polymer prepared using as its major component vinylcyclohexane or styrene.

Examples of the organoaluminum compound catalyst component (d), which is optionally used in the preparation of the olefin polymerization catalyst, include trialkylaluminums such as trimethylaluminum; alkenylaluminums such as isoprenylaluminum; dialkylaluminum halides such as dimethylaluminum chloride; alkylaluminum sesquihalides such as methylaluminum sesquichloride; alkylaluminum dihalides such as methylaluminum dichloride; and alkylaluminum hydrides such as diethylaluminum hydride.

Examples of the ionized ionic compound catalyst component (e) include triphenylborons described in U.S. Pat. No. 5,321,106; Lewis acid such as $MgCl_2$, $Al_2O_3$ and $SiO_2-Al_2O_3$; ionic compounds such as triphenylcarbeniumtetrakis(pentafluorophenyl)borate; and carborane compounds such as dodecaborane and bis-n-butylammonium(1-carbedodeca)borate.

The linear low-density polyethylene resin (I) used in the present invention can be obtained by copolymerizing ethylene and an α-olefin of 4 or more carbon atoms in the presence of the olefin polymerization catalyst comprising the metallocene catalyst component (a) and the organoaluminum oxy-compound catalyst component (b), and if desired, the fine particle carrier (c), the organoaluminum compound catalyst component (d) and the ionized ionic compound catalyst component (e), in a gas phase or a liquid phase such as slurry or solution under various conditions.

In the slurry polymerization process or the solution polymerization process, an inert hydrocarbon may be used as a solvent, or the olefin itself may be used as a solvent.

In the polymerization, the metallocene catalyst for olefin polymerization is desirably used in an amount of usually $10^{-8}$ to $10^{-3}$ g·atom/liter, preferably $10^{-7}$ to $10^{-4}$ g·atom/liter, in terms of a concentration of the transition metal atom in the polymerization solution.

In the polymerization, an organoaluminum oxy-compound catalyst component (b) not supported on the carrier and/or an organoaluminum compound catalyst component (d) not supported on the carrier may be used in addition to the organoaluminum oxy-compound catalyst component (b) supported on the carrier and the organoaluminum compound catalyst component (d) supported on the carrier. In this case, an atomic ratio of the aluminum atom (Al) derived from the non-supported type organoaluminum oxy-compound catalyst component (b) and/or the non-supported type organoaluminum compound catalyst component (d) to the transition metal atom (M) derived from the metallocene catalyst component (a), Al/M, is in the range of 5 to 300, preferably 10 to 200, more preferably 15 to 150.

The polymerization temperature in the slurry polymerization process is in the range of usually −50° to 100° C., preferably 0° to 90° C., and the temperature in the solution polymerization process is in the range of usually −50° to 500° C., preferably 0° to 400° C. The temperature in the gas phase polymerization process is in the range of usually 0° to 120° C., preferably 20° to 100° C.

The polymerization pressure is in the range of usually atmospheric pressure to 100 $kg/cm^2$, preferably 2 to 50 $kg/cm^2$. The polymerization can be carried out in any of a batchwise process, a semi-continuous process and a continuous process.

In the preparation of the linear low-density polyethylene resin (I), various means, such as (1) multi-stage polymerization, (2) multi-stage polymerization in a liquid phase and a gas phase and (3) prepolymerization in a liquid phase followed by gas phase polymerization, may be adopted according to necessity.

(II) Linear Medium or High-Density Polyethylene Resin

The linear medium or high-density polyethylene resin (II) used in the present invention is an ethylene homopolymer or an ethylene/α-olefin copolymer.

Examples of the α-olefins for constituting the ethylene/α-olefin copolymer include α-olefin of 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these, preferred are propylene, 1-butene, 1-pentene, 1-hexene, 4-methyl-1-pentene and 1-octene.

The amount of α-olefin in the ethylene/α-olefin copolymer is not more than 10 % by mol, preferably 0.2 to 7% by mol.

The linear medium or high-density polyethylene resin (II) has a density (ASTM D 1505) of 0.935 to 0.970 $g/cm^3$, preferably 0.937 to 0.968 $g/cm^3$. When the linear medium or high-density polyethylene resin (II) having a density within the above range is used, a polyethylene resin composition capable of providing a film of high rigidity, strength and nerve can be obtained.

The linear medium or high-density polyethylene resin (II) has a melt flow rate (MFR, ASTM D 1238, 190° C., load of 2.16 kg) of usually 2.0 to 60 g/10 min, preferably 2.5 to 50 g/10 min, more preferably 2.8 to 40 g/10 min. When the linear medium or high-density polyethylene resin (II) having a melt flow rate within the above range is used, a polyethylene resin composition having good extrudability in the film molding by air-cooling inflation and capable of providing a film of high strength can be obtained.

The linear medium or high-density polyethylene resin (II) has a molecular weight distribution (Mw/Mn), as measured by GPC, of usually 2.0 to 5.0, preferably 2.0 to 4.5. When the linear medium or high-density polyethylene resin (II) having a molecular weight distribution within the above range is used, a polyethylene resin composition capable of providing a film of high rigidity, strength and nerve can be obtained.

In the present invention, the linear medium or high-density polyethylene resin (II) is used in an amount of 1 to 55 parts by weight, preferably 10 to 50 parts by weight, more preferably 20 to 45 parts by weight, based on 100 parts by weight of the total of the resins (I), (II) and (III). When the linear medium or high-density polyethylene resin (II) is used in the above-defined amount, a polyethylene resin composition capable of providing a film of high nerve can be obtained.

The linear medium or high-density polyethylene resin (II) can be prepared by, for example, a low-pressure process using a Ziegler-Natta catalyst, a low-pressure process using a metallocene catalyst or a medium-pressure process such as Phillips process.

(III) High-Pressure Low-Density Polyethylene Resin

The high-pressure low-density polyethylene resin (III) used in the present invention is an ethylene homopolymer or an ethylene/vinyl acetate copolymer.

The amount of vinyl acetate in the ethylene/vinyl acetate copolymer is in the range of 2 to 10% by mol, preferably 2 to 8% by mol.

The high-pressure low-density polyethylene resin (III) has a density (ASTM D 1505) of 0.915 to 0.924 g/cm$^3$, preferably 0.918 to 0.924 g/cm$^3$. When the high-pressure low-density polyethylene resin (III) having a density within the above range is used, a polyethylene resin composition capable of providing a film of high rigidity and strength can be obtained.

The high-pressure low-density polyethylene resin has a melt tension of not less than 5 g, preferably not less than 7 g. The melt tension is measured by means of a melt tension tester produced by Toyo Seiki Seisakusho K.K. The measuring conditions are as follows.

Measuring Conditions

Nozzle: L=8.000 mm, D=2.095 mm
Measuring temperature: 190° C.
Resin extrusion rate: 15 mm/min
Take-up rate: 2 m/min The high-pressure low-density polyethylene resin (III) has a melt flow rate (MFR, ASTM D 1238, 190° C., load of 2.16 kg) of usually 0.1 to 2.0 g/10 min, preferably 0.1 to 1.5 g/10 min, more preferably 0.2 to 1.5 g/10 min. When the high-pressure low-density polyethylene resin (III) having a melt flow rate within the above range is used, a polyethylene resin composition having good extrudability in the film molding by air-cooling inflation and capable of providing a film of high bubble stability and uniform thickness can be obtained.

In the present invention, the high-pressure low-density polyethylene resin (III) is used in an amount of 5 to 29 parts by weight, preferably 5 to 25 parts by weight, more preferably 7 to 25 parts by weight, based on 100 parts by weight of the total of the resins (I), (II) and (III). When the high-pressure low-density polyethylene resin (III) is used in the above-defined amount, a polyethylene resin composition capable of providing a film of good low-temperature properties such as low-temperature drop-bag strength and high transparency can be obtained. For heavy-duty packaging bags of organic fertilizers or the like, it is required that the contents in the bags can be seen from the outside, so that the film for heavy-duty packaging bag needs to have high transparency.

The high-pressure low-density polyethylene resin (III) can be prepared by, for example, a process of radical polymerization under the conditions of a pressure of 1,000 to 2,000 atm and a temperature of 200° to 300° C., namely high-pressure process.

Polyethylene Resin Composition for Heavy-Duty Packaging Bag

The polyethylene resin composition for heavy-duty packaging bag according to the present invention can be obtained by blending the linear low-density polyethylene resin (I), the linear medium or high-density polyethylene resin (II) and the high-pressure low-density polyethylene resin (III) in the above-mentioned blending ratio by a dry blend method using a Henschel mixer or the like, a melt blend method using an extruder or the like, or a method of combination of these methods.

The polyethylene resin composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The melt flow rate (ASTM D 1238, 190° C., load of 2.16 kg) of the polyethylene resin composition for heavy-duty packaging bag obtained above is 0.5 to 2.0 g/10 min, preferably 0.5 to 1.8 g/10 min, more preferably 0.5 to 1.5 g/10 min, most preferably 0.5 to 1.0 g/10 min. In the case where a film having a higher surface gloss is formed, the melt flow rate is preferably more than 1.0 to 2.0 g/10 min.

The density (ASTM D 1505) of the polyethylene resin composition is 0.918 to 0.935 g/cm$^3$, preferably 0.920 to 0.935 g/cm$^3$, more preferably 0.922 to 0.935 g/cm$^3$.

The melt tension of the polyethylene resin composition is not less than 5 g, preferably 5.5 to 15 g. The melt tension is measured in the same manner as described above.

Polyethylene Resin Film for Heavy-Duty Packaging Bag

The polyethylene resin film for heavy-duty packaging bag according to the present invention is a film obtained by molding the above-described polyethylene resin composition by an air-cooling inflation method.

The polyethylene resin film has a Young's modulus in tension of not less than 4,000 kg/cm$^2$ and a dart impact strength of not less than 55 kg/cm. The gloss of this film is not less than 50%. The thickness of the heavy-duty packaging polyethylene resin film of the invention is in the range of 30 to 200 μm.

EFFECT OF THE INVENTION

The polyethylene resin composition for heavy-duty packaging bag according to the present invention comprises (I) the linear low-density polyethylene resin prepared from ethylene and an α-olefin of 4 or more carbon atoms and having a specific MFR, a specific molecular weight distribution (Mw/Mn) and a density of 0.900 to 0.918 g/cm$^3$, (II) the linear medium or high-density polyethylene resin having a density of 0.935 to 0.970 g/cm$^3$ and (III) the high-pressure low-density polyethylene resin having a density of 0.915 to 0.924 g/cm$^3$ in a specific ratio. This composition has a specific MFR, a specific density and a specific melt tension, so that it is able to provide a film which has such high low-temperature properties particularly low-temperature drop-bag strength that it can be advantageously used for a heavy-duty packaging bag even in a cold district of below-freezing temperature.

The polyethylene resin film for heavy-duty packaging bag according to the present invention is produced from the above-described polyethylene resin composition, so that the film can be advantageously used for a heavy-duty packaging bag even in a cold district of below-freezing temperature. Moreover, since the polyethylene resin film has excellent low-temperature properties, the thickness of the film can be made smaller and high-speed molding of the film is possible.

EXAMPLES

The present invention will be further described with reference to the following examples, but it should be construed that the invention is in no way limited to those example.

In the examples, measurement of properties of the films and bags was carried out in accordance with the following methods.

(1) Young's modulus

A tensile test of a film in each of the machine direction (MD) and the transverse direction (TD) was carried out by the use of a tensile tester of crosshead movement constant rate type (available from Instron Co.).

Test Conditions

Sample: JIS K 6781
Surrounding temperature: 23° C.
Rate of pulling: 500 mm/min
Chart speed: 200 mm/min Using the chart obtained by the above test, a Young's modulus of the film in each of MD and TD was calculated in accordance with the following formula, and a mean value of the obtained values was taken as the Young's modulus (E).

$$E_0=R_0(L_0/A)$$

wherein $E_0$ is a Young's modulus in each direction, $R_0$ is an initial gradient, $L_0$ is a distance between chucks, and A is a minimum area of the sample just after the preparation.

The initial gradient $R_0$ was calculated from the following formula:

$$R_0=F_1/L_1$$

wherein $F_1$ is a load at the optional point on the initial tangent line, and $L_1$ is an elongation corresponding to $F_1$ on the tangent line.

(2) Dart Impact Strength

The measured value obtained in accordance with ASTM D 1709 B was divided by the thickness of the film. The resulting value was regarded as the dart impact strength.

(3) Gloss

The gloss of the film was measured in accordance with ASTM D 523 at an incident angle of 60 degrees.

(4) Sealing Strength

A film was sealed by means of a New Long HS-33D Top Sealer (trade name, available from Tester Sangyo K.K.). Then, a tensile test of the film was carried out by the use of a tensile tester of crosshead movement constant rate type (available from Instron Co.) to measure a tensile strength at break, which was taken as the sealing strength.

(5) Low-Temperature Properties (a) Low-temperature drop-bag vertical strength test Ten bags, each of which had been sealed at its top and bottom by means of a New Long HS-33D Top Sealer (trade name, available from Tester Sangyo K.K.) under the conditions of a heater gap of 150 % and a cooler gap of 200% and had contents of 25 kg, were prepared. They were dropped from the height of 2 m in an atmosphere of −10° C. in such a manner that the bottoms of the bags faced down, to measure the number of broken bags. Separately, another ten of bags were dropped from the height of 1.75 m, 1.5 m and 1 m in the same manner as described above.

(b) Low-temperature drop-bag lateral strength test

Ten bags each of which had been sealed at its top and bottom by means of a New Long HS-33D Top Sealer (trade name, available from Tester Sangyo K.K.) under the conditions of a heater gap of 150% and a cooler gap of 200% and had contents of 25 kg were prepared. They were dropped from the height of 2 m in an atmosphere of −20° C. in such a manner that the sides of the bags faced down, to measure the number of broken backs. Separately, another ten of bags were dropped from the height of 1.75 m, 1.5 m and 1 m in the same manner as described above.

REFERENCE EXAMPLE 1

Preparation of Olefin Polymerization Catalyst 6.3 kg of silica having been dried at 250° C. for 10 hours was suspended in 100 liters of toluene. The resulting suspension was cooled to 0° C. To the suspension was dropwise added 41 liters of a toluene solution of methylaluminoxane (Al: 0.96 mol/liter) over a period of 1 hour, while the temperature of the system was kept at 0° C., followed by performing reaction at 0° C. for 60 minutes. Then, the temperature of the system was elevated up to 95° C. over a period of 1.5 hours, and the reaction was continued at the same temperature for 4 hours. Thereafter, the temperature of the system was cooled to 60° C., and the supernatant liquid was removed by decantation to obtain a solid.

The solid was washed twice with toluene and resuspended in 125 liters of toluene. To the system was dropwise added 15 liters of a toluene solution of bis(n-butylcyclopentadienyl)zirconium dichloride (Zr: 42.7 mmol/liter) at 30° C. over a period of 30 minutes, to continue the reaction at 30° C. for another 2 hours. Then, the supernatant liquid was removed, and the residue was washed twice with hexane to obtain a solid catalyst containing 6.2 mg of zirconium per 1 g of the catalyst.

Preparation of Prepolymerized Catalyst

To 300 liters of hexane containing 14 mol of triisobutylaluminum was added 8.5 kg of the solid catalyst obtained above, to perform prepolymerization of ethylene at 35° C. for 7 hours. Thus, a prepolymerized catalyst in which 3 g of polyethylene was prepolymerized per 1 g of the solid catalyst was obtained.

Preparation of Linear Low-Density Polyethylene Resin

In a continuous type fluidized bed gas phase polymerization reactor, copolymerization of ethylene and 1-hexene was carried out in the presence of the prepolymerized catalyst obtained above.

The linear low-density polyethylene resin thus obtained had a 1-hexene content of 5.3% by mol, a density of 0.905 g/cm$^3$, a melt flow rate of 0.5 g/10 min and Mw/Mn of 2.1.

This linear low-density polyethylene resin was used in Examples 1, 3, 5 and 7.

REFERENCE EXAMPLE 2

Preparation of Linear Low-Density Polyethylene Resin

In a continuous type fluidized bed gas phase polymerization reactor, copolymerization of ethylene and 1-hexene was carried out in the presence of the prepolymerized catalyst obtained in Reference Example 1.

The linear low-density polyethylene resin thus obtained had a 1-hexene content of 3.2% by mol, a density of 0.915 g/cm$^3$, a melt flow rate of 0.5 g/10 min and Mw/Mn of 2.0.

This linear low-density polyethylene resin was used in Examples 2, 4 and 6.

REFERENCE EXAMPLE 3

Preparation of Olefin Polymerization Catalyst 10 mol of commercially available anhydrous magnesium chloride was suspended in 50 liters of dehydrated and purified hexane in a stream of nitrogen. To the suspension was dropwise added 60 mol of ethanol over a period of 1 hour with stirring, followed by performing reaction at room temperature for 1 hour.

To the reaction solution was dropwise added 27 mol of diethylaluminum chloride at room temperature, and they were stirred for 1 hour.

After 100 mol of titanium tetrachloride was added, the system was heated to 70° C. to perform reaction for 3 hours with stirring. The resulting solid was separated by decantation, then repeatedly washed with purified hexane and suspended in hexane to give a suspension.

Preparation of Linear Low-Density Polyethylene Resin

In a 200-liter continuous type polymerization reactor, copolymerization of ethylene and 4-methyl-1-pentene was carried out in the presence of the catalyst obtained above.

The linear low-density polyethylene resin thus obtained had a 4-methyl-1-pentene content of 4.0% by mol, a density of 0.910 g/cm$^3$, a melt flow rate of 2.0 g/10 min and Mw/Mn of 3.8.

This linear low-density polyethylene resin was used in Comparative Example 1.

REFERENCE EXAMPLE 4

Preparation of linear low-density polyethylene resin

In a continuous type fluidized bed gas phase polymerization reactor, copolymerization of ethylene and 4-methyl-1-pentene was carried out in the presence of the prepolymerized catalyst obtained in Reference Example 3.

The linear low-density polyethylene resin thus obtained had a 4-methyl-1-pentene content of 3.5% by mol, a density of 0.915 g/cm$^3$, a melt flow rate of 2.0 g/10 min and Mw/Mn of 3.5.

This linear low-density polyethylene resin was used in Comparative Example 2.

EXAMPLES 1–6, COMPARATIVE EXAMPLE 1

A linear low-density polyethylene resin (LLDPE), a linear polyethylene resin (LPE) and a high-pressure low-density polyethylene resin (HPLDPE), all shown in Table 1, were mixed by a Henschel mixer and pelletized by an extruder.

The properties of the polyethylene resin composition obtained above are set forth in Table 1.

This composition was then subjected to air-cooling inflation under the following molding conditions, to prepare a film having a thickness of 150 µm and a width of 450 mm.

Molding Conditions

Molding machine: inflation molding machine having a diameter of 90 mm, available from Modern Machinery K.K. (designed for high-pressure low-density polyethylene resins)

Screw: L/D=28, C-R=2.8, equipped with intermediate mixing means

Die: 200 mm in diameter, 2.5 mm in lip width

Air ring: 2-gap type

Molding temperature: 190° C.

Take-up rate: 20 m/min

The resin extrudability is evaluated with AA (good) and BB (bad). The bubble stability is evaluated with AA (good) and BB (bad).

The Young's modulus, dart impact strength, gloss and sealing strength of the film and the properties of the bag were measured by the aforesaid methods.

The results are set forth in Table 1.

EXAMPLE 7

A film having a thickness of 130 µm was prepared from the same polyethylene resin composition as used in Example 5 in the same manner as in Example 1. In this example, the take-up rate of the film was 23 m/min.

The Young's modulus, dart impact strength, gloss and sealing strength of the film and the properties of the bag were measured by the aforesaid methods.

The results are set forth in Table 1.

COMPARATIVE EXAMPLE 2

A linear low-density polyethylene resin (LLDPE) and a linear polyethylene resin (LPE), both shown in Table 1, were mixed by a Henschel mixer and pelletized by an extruder.

The properties of the polyethylene resin composition obtained above are set forth in Table 1.

This composition was then subjected to air-cooling inflation under the same molding conditions as in Example 1, to prepare a film having a thickness of 150 µm and a width of 450 mm.

The Young's modulus, dart impact strength, gloss and sealing strength of the film and the properties of the bag were measured by the aforesaid methods.

The results are set forth in Table 1.

TABLE 1

| | (I) | | | | |
|---|---|---|---|---|---|
| | Ex. 1 | Ex. 2 | Ex. 3 | Ex. 4 | Ex. 5 |
| (1) LLDPE | | | | | |
| Kind of α-olefin | 1-hexene | 1-hexene | 1-hexene | 1-hexene | 1-hexene |
| Amount of α-olefin (mol %) | 5.3 | 3.2 | 5.3 | 3.2 | 5.3 |
| MFR (190° C.) (g/10 min) | 0.5 | 0.5 | 0.5 | 0.5 | 0.5 |
| Density (g/cm³) | 0.905 | 0.915 | 0.905 | 0.915 | 0.905 |
| Mw/Mn | 2.1 | 2.0 | 2.1 | 2.0 | 2.1 |
| (II) LPE (II-A) | | | | | |
| Amount of 4-methyl-1-pentene (mol %) | 0.8 | 0.8 | 0.8 | 0.8 | — |
| Density (g/cm³) | 0.939 | 0.939 | 0.939 | 0.939 | — |
| MFR (190° C.) (g/10 min) | 3.5 | 3.5 | 3.5 | 3.5 | — |
| Mw/Mn | 3.0 | 3.0 | 3.0 | 3.0 | — |
| (II-B) | | | | | |
| Density (g/cm³) | 0.967 | — | 0.967 | 0.967 | 0.967 |
| MFR (190° C.) (g/10 min) | 5.0 | — | 5.0 | 5.0 | 5.0 |
| Mw/Mn | 5.6 | — | 5.6 | 5.6 | 5.6 |
| (III) HPLDPE | | | | | |
| Density (g/cm³) | 0.921 | 0.921 | 0.921 | 0.921 | 0.921 |
| MFR (190° C.) (g/10 min) | 0.35 | 0.35 | 0.35 | 0.85 | 0.35 |
| Blending ratio by weight) (I)/(II-A)/(II-B)/(III) | 50/17.5/17.5/15 | 50/35/0/15 | 50/5/30/15 | 50/25/10/15 | 50/0/35/15 |

(Remarks)
LLDPE: linear low-density polyethylene resin,
LPE: linear, medium or high-density polyethylene resin,
HPLDPE: high-pressure low-density polyethylene resin

TABLE 1

| | (II) | | | |
|---|---|---|---|---|
| | Ex. 6 | Ex. 7 | Comp. Ex. 1 | Comp. Ex. 2 |
| (1) LLDPE | | | | |
| Kind of α-olefin | 1-hexene | 1-hexene | 4-methyl-1-pentene | 4-methyl-1-pentene |
| Amount of α-olefin (mol %) | 3.2 | 5.3 | 4.0 | 3.5 |
| MFR (190° C.) (g/10 min) | 0.5 | 0.5 | 2.0 | 2.0 |
| Density (g/cm³) | 0.915 | 0.905 | 0.910 | 0.915 |
| Mw/Mn | 2.0 | 2.1 | 3.8 | 3.5 |
| (II) LPE (II-A) | | | | |
| Amount of 4-methyl-1-pentene (mol %) | 0.8 | — | 0.8 | 0.8 |
| Density (g/cm³) | 0.939 | — | 0.940 | 0.940 |
| MFR (190° C.) (g/10 min) | 3.5 | — | 0.06 | 0.06 |
| Mw/Mn | 3.0 | — | 12 | 12 |

TABLE 1-continued

| | (II) | | | |
|---|---|---|---|---|
| | Ex. 6 | Ex. 7 | Comp. Ex. 1 | Comp. Ex. 2 |
| (II-B) | | | | |
| Density (g/cm³) | 0.967 | 0.967 | — | — |
| MFR (190° C.) (g/10 min) | 5.0 | 5.0 | — | — |
| Mw/Mn | 5.6 | 5.6 | — | — |
| (III) HPLDPE | | | | |
| Density (g/cm³) | 0.921 | 0.921 | 0.922 | — |
| MFR (190° C.) (g/10 min) | 0.35 | 0.35 | 0.6 | — |
| Blending ratio (by weight) (I)/(II-A)/(II-B)/(III) | 50/17.5/17.5/15 | 50/0/35/15 | 45/30/0/25 | 50/50/0/0 |

(Remarks)
LLDPE: linear low-density polyethylene resin,
LPE: linear, medium or high-density polyethylene resin,
HPLDPE: high-pressure low-density polyethylene resin

TABLE 1

| | (III) | | | | |
|---|---|---|---|---|---|
| | Ex. 1 | Ex. 2 | Ex. 3 | Ex. 4 | Ex. 5 |
| Composition | | | | | |
| MFR (190° C.) (g/10 min) | 0.81 | 0.85 | 0.84 | 0.86 | 0.84 |
| Density (g/cm³) | 0.924 | 0.926 | 0.928 | 0.928 | 0.929 |
| Melt tension (g) | 7.2 | 6.4 | 7.7 | 7.0 | 7.3 |
| Film moldability | | | | | |
| Resin extrudability (*1) | AA | AA | AA | AA | AA |
| Bubble stability (*2) | AA | AA | AA | AA | AA |
| Film property | | | | | |
| Thickness (μm) | 150 | 150 | 150 | 150 | 150 |
| Young's modulus (×10³ kg/cm²) | 4.6 | 4.4 | 5.4 | 5.1 | 5.8 |
| Dart impact strength (kg/cm) | 97 | 71 | 86 | 70 | 85 |
| Gloss (%) | 72 | 74 | 60 | 75 | 62 |
| Sealing strength (g/15 mm) | 5700 | 5700 | 5700 | 5600 | 5700 |
| Bag property Low-temperature drop-bag vertical strength (−10° C.) | | | | | |

TABLE 1-continued

| (III) | | | | | |
|---|---|---|---|---|---|
| | Ex. 1 | Ex. 2 | Ex. 3 | Ex. 4 | Ex. 5 |
| (Number of broken bags) | | | | | |
| Drop height | | | | | |
| 2 m | 0 | 0 | 0 | 1 | 0 |
| 1.75 m | 0 | 0 | 0 | 0 | 0 |
| 1.5 m | 0 | 0 | 0 | 0 | 0 |
| 1 m | 0 | 0 | 0 | 0 | 0 |
| Low-temperature drop-bag lateral strength (−20° C.) (Number of broken bags) | | | | | |
| Drop height | | | | | |
| 2 m | 0 | 2 | 2 | 3 | 0 |
| 1.75 m | 0 | 1 | 2 | 3 | 0 |
| 1.5 m | 0 | 1 | 2 | 2 | 0 |
| 1 m | 0 | 0 | 1 | 2 | 0 |

(*1) AA: good resin extrudability
(*2) AA: good bubble stability

TABLE 1

| (IV) | | | | |
|---|---|---|---|---|
| | Ex. 6 | Ex. 7 | Comp. Ex. 1 | Comp. Ex. 2 |
| Composition | | | | |
| MFR (190° C.) (g/10 min) | 0.88 | 0.84 | 0.47 | 0.29 |
| Density (g/cm³) | 0.930 | 0.929 | 0.924 | 0.929 |
| Melt tension (g) | 7.5 | 7.3 | 10 | 13 |
| Film moldability | | | | |
| Resin extrudability (*1) | AA | AA | AA | AA |
| Bubble stability (*2) | AA | AA | AA | AA |
| Film property | | | | |
| Thickness (μm) | 150 | 130 | 150 | 150 |
| Young's modulus (×10³ kg/cm²) | 5.6 | 5.5 | 3.9 | 5.3 |
| Dart impact strength (kg/cm) | 69 | 83 | 54 | 50 |
| Gloss (%) | 68 | 62 | 72 | 35 |
| Sealing strength (g/15 min) | 5700 | 5200 | 5500 | 4500 |
| Bag property | | | | |
| Low-temperature drop bag vertical strength (−10° C.) (Number of broken bags) | | | | |
| Drop height | | | | |
| 2 m | 1 | 0 | 5 | 5 |
| 1.75 m | 1 | 0 | 5 | 5 |
| 1.5 m | 1 | 0 | 5 | 5 |
| 1 m | 0 | 0 | 0 | 2 |
| Low-temperature drop-bag lateral strength (−20° C.) (Number of broken bags) | | | | |
| Drop height | | | | |
| 2 m | 5 | 0 | 5 | 5 |
| 1.75 m | 3 | 0 | 5 | 5 |
| 1.5 m | 3 | 0 | 5 | 5 |
| 1 m | 1 | 0 | 5 | 5 |

(*1) AA: good resin extrudability
(*2) AA: good bubble stability

What is claimed is:

1. A polyethylene resin composition for heavy-duty packaging bags, comprising:
   (I) 40 to 70 parts by weight of a linear low-density polyethylene resin which is an ethylene/α-olefin copolymer prepared by copolymerizing ethylene and an α-olefin of 4 or more carbon atoms in the presence of a metallocene catalyst and having a melt flow rate (190° C.) of 0.1 to 1.0 g/10 min, a density of 0.900 to 0.918 g/cm³ and a molecular weight distribution (Mw/Mn), as measured by GPC, of 1.5 to 3.5,
   (II) 1 to 55 parts by weight of a linear medium or high density polyethylene resin having a density of 0.935 to 0.970 g/cm³ and a melt flow rate (190° C.) of 2.0 to 60 g/10 min, and
   (III) 5 to 29 parts by weight of a high-pressure low-density polyethylene resin having a density of 0.915 to 0.924 g/cm³, the total amount of said resins (I), (II) and (III) being 100 parts by weight;
   said polyethylene resin composition having:
   (i) a melt flow rate (190° C.) of 0.5 to 2.0 g/10 min,
   (ii) a density of 0.918 to 0.935 g/cm³, and
   (iii) a melt tension of not less than 5 g.

2. The polyethylene resin composition as claimed in claim 1, wherein the polyethylene resin composition has a melt flow rate (190° C.) of more than 1.0 to 2.0 g/10 min.

3. A polyethylene resin film for heavy-duty packaging bags prepared from a polyethylene resin composition having a melt flow rate (190° C.) of 0.5 to 2.0 g/10 min, a density of 0.918 to 0.935 g/cm³, and a melt tension of not less than 5 g, by means of air-cooling inflation,
   said polyethylene resin composition comprising:
   (I) 40 to 70 parts by weight of a linear low-density polyethylene resin which is an ethylene/α-olefin copolymer prepared by copolymerizing ethylene and an α-olefin of 4 or more carbon atoms in the presence of a metallocene catalyst and having a melt flow rate (190° C.) of 0.1 to 1.0 g/10 min, a density of 0.900 to 0.918 g/cm³ and a molecular weight distribution (Mw/Mn), as measured by GPC, of 1.5 to 3.5,
   (II) 1 to 55 parts by weight of a linear medium or high density polyethylene resin having a density of 0.935 to 0.970 g/cm³ and a melt flow rate (190° C.) of 2.0 to 60 g/10 min, and
   (III) 5 to 29 parts by weight of a high-pressure low-density polyethylene resin having a density of 0.915 to 0.924 g/cm³,
   the total amount of said resins (I), (II) and (III) being 100 parts by weight;
   said film having:

(i) a Young's modulus in tension of not less than 4,000 kg/cm$^2$, and (ii) a dart impact strength of not less than 55 kg/cm, said dart impact strength having been obtained by dividing the measured value obtained in accordance with ASTM D 1709 B by the thickness of the film.

4. The polyethylene resin film as claimed in claim 3, wherein the polyethylene resin composition has a melt flow rate (190° C.) of more than 1.0 to 2.0 g/10 min.

5. The polyethylene resin film as claimed in claim 3, wherein the film has a gloss of not less than 50%, said gloss having been measured in accordance with ASTM D 523 at an incident angle of 60 degrees.

6. The polyethylene resin as claimed in claim 3, wherein the film has a thickness of 30 to 200 μm.

* * * * *